Feb. 11, 1930.  A. A. VAN NOTE  1,747,092
AUTOMOBILE HOOD FASTENER
Filed Dec. 13, 1928
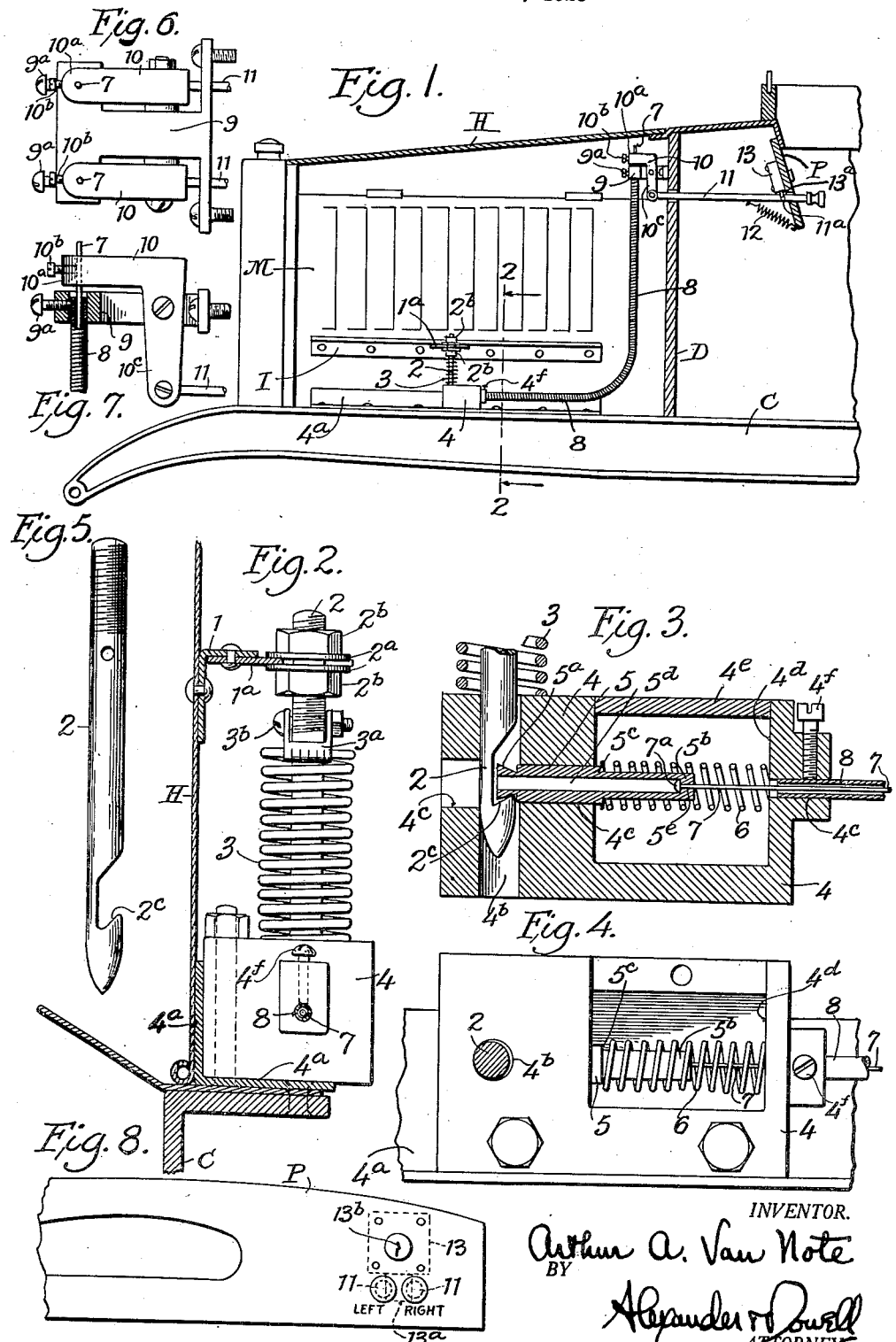

Patented Feb. 11, 1930

1,747,092

UNITED STATES PATENT OFFICE

ARTHUR AMBROSE VAN NOTE, OF LONG BRANCH, NEW JERSEY

AUTOMOBILE HOOD FASTENER

Application filed December 13, 1928. Serial No. 325,844.

This invention is a novel improvement in automobile hood fastening means, and the principal object of the invention is to provide a simple, novel and efficient locking means, operable from the dash board of the automobile to prevent unauthorized access to the motor and other parts under the hood, means being provided on the dash plate for normally locking the operating means of the fastener against unauthorized movement.

The hood locking means can be readily adapted to fit any automobile or other vehicle; and use of the same dispenses with the usual exterior hood clips, now universally used on most automobiles; moreover use of my novel locking means provides protection against theft of the vehicle, and prevents hood rattles and noises, and permits a smooth exterior for the hood. Also the lock cannot become unfastened unless the operating member is manipulated.

I will explain the invention with reference to the accompanying drawing, which illustrates one practical embodiment thereof to enable others to adopt and use the same; and will summarize in the claims the novel features of construction, and novel combinations of parts, for which protection is desired.

In said drawings:
Fig. 1 is a longitudinal section through an automobile hood showing my novel hood locking means applied thereto.

Fig. 2 is an enlarged transverse section on the line 2—2 Fig. 1.
Fig. 3 is an enlarged longitudinal section through the socket casing.

Fig. 4 is a top plan view thereof with cover plate removed.

Fig. 5 is an enlarged elevation of the hook rod detached.

Fig. 6 is an enlarged top plan view of the bracket and bell-crank levers.

Fig. 7 is a side elevation thereof.

Fig. 8 is a plan view of the dash board.
As shown my novel hood locking means is applied to each side of the hood H, and preferably comprises an angle iron 1 attached by bolts, rivets or the like to the inside of the hood H adjacent the lower edge thereof, said angle iron having a slotted plate $1^a$ secured to its horizontal leg through which extends a hook rod 2, secured in adjusted position by washers $2^a$ and nuts $2^b$ disposed above and below the slotted plate $1^a$, whereby the hook rod 2 may be adjusted vertically and horizontally with respect to the side of the hood H. Rod 2 extends vertically downwardly, and has a notch $2^c$ in its lower end adapted to be engaged with the head of a locking plunger 5, hereinafter set forth, the rod 2 extending normally down into a socket casting 4 carrying said plunger 5.

Around rod 2 is a coil spring 3 having its upper end maintained in adjusted position by means of a clip $3^a$ wrapped around the upper ring of the coil and bolted through the rod 2 as at $3^b$, spring 3 normally seating upon the top of casing 4 so as to yieldably maintain the notched portion $2^c$ of rod 2 into locked engagement with the head of plunger 5, as shown in Fig. 3, thereby preventing accidental disengagement of said parts. The construction of the engaging portions of plunger 5 and rod 2 is such that the engagement is tightened by jolting of the vehicle, the notch $2^c$ being undercut as shown.

Casing 4 is preferably made of aluminum and of substantially rectangular shape, the same being bolted down into the bosom of an angle iron $4^a$ which in turn is riveted or bolted down upon the top of the chassis bar C directly below and in the path of rod 2. Casing 4 is provided with a vertical bore $4^b$ for the reception of the lower end of hook rod 2. Intersecting bore $4^b$, at right angles thereto, is a horizontal bore $4^c$ for the reception of the plunger 5, said bore $4^c$ extending entirely through casing 4. Within bore $4^c$ is slidably mounted the plunger 5, having a head $5^a$ in the form of truncated cone, with the larger end of the cone disposed outermost and said head being adapted to be engaged by the lip of undercut notch $2^c$. Plunger 5 has a reduced inner end $5^b$ around which extends a coil spring 6 disposed between the shoulder $5^c$ and the rear wall of the casing 4, and spring 6 normally urges the head $5^a$ of plunger 5 outwardly into the vertical bore $4^b$ and hence into locking engagement with hook rod 2.

A wire or other flexible non-stretchable element 7 extends into the bore $4^c$ and is secured to the plunger 5 whereby the same can be retracted against the action of spring 6. Plunger 5 is preferably provided with a longitudinal bore $5^d$ having a reduced inner end $5^e$ just large enough for the passage of the wire 7. The wire 7 may be secured to the plunger 5 by passing same through the little end $5^e$ of the bore and then making a knot or head $7^a$ upon the wire sufficiently large to be prevented from passing through the bore $5^e$. The casing 4, in way of plunger 5 and spring 6, is hollowed out as at $4^c$, the hollowed portion being normally closed by a removable cover plate $4^e$, whereby access may be had to the plunger 5 and spring 6 for replacement, adjustment, removal, etc.

Wire 7 extends through a pipe 8 one end of which enters the bore $4^c$ and is secured therein by a set screw $4^f$, and the other end of cable 8 enters a bore in a bracket 9 mounted on the dash board D of the vehicle and is secured in the bore by a set screw $9^a$. Pipe 8 intermediate its ends, may be secured to the chassis, frame, or body of the vehicle in any desired manner, and forms a fixed guide of the wire 7 extending therethrough.

Bracket 9 is preferably T-shaped, and a bell crank lever 10 is pivoted at each side thereof (Figs. 6 and 7) each lever 10 having its upper end $10^a$ overlying a bore in the end of the T-head of bracket 9. The pipes 8 are secured in the bores by set screws $9^a$ (Fig. 7) while the wires 7 extend upwardly through the bores in bracket 9 and are secured by set screws $10^b$ in bores in the upper ends $10^a$ of the bell crank levers 10, whereby as the levers $10^a$ are raised the wires 7 will be pulled in the guide pipes 8 to release the plungers 5.

Parallel rods 11 extend through the dash plate P and through dash board D, and are respectively secured to the lower lever legs $10^c$ of the bell-crank levers 10, so that as each rod 11 is pushed its related bell-crank lever leg $10^a$ will be raised to pull the wire 7 and hence release the hook rod 2 on the hood H. A spring 12 connecting each rod 11 with the dash plate P normally urges the bell-crank lever leg $10^a$ into retracted position (shown in Fig. 7).

Secured to the dash plate P between the rods 11 is a lock 13, preferably of the "Yale" type, having a sliding bolt $13^a$ of width somewhat greater than the distance between the rods 11, the bolt $13^a$ being adapted to enter opposed slots $11^a$ (Fig. 1) in the rods 11 to normally prevent the rods 11 from being shifted to unlock the hook rods 2. When however the sliding bolt $13^a$ is retracted by inserting and turning the key in the tumbler slot $13^b$, rods 11 may be shifted to operate the plungers 2 permitting either or both sides of the hood to be raised.

I claim:

1. The combination with an automobile including chassis bars and a hood; of a vertically disposed hook rod mounted at each side of the hood; a socket member carried by each chassis bar and having a bore normally receiving the hook rod; a plunger reciprocably mounted in said socket member and having a head adapted to enter the bore and engage the hook rod to lock the latter therein; means for yieldably urging the plunger head into the bore; means for yieldably raising the hook rod out of the bore when the plunger is retracted out of locking engagement; and means for retracting the plunger to release the hook rod.

2. In a combination as set forth in claim 1, the hook rod having an undercut recess in its side; and the plunger head being wedge shaped with the larger end outermost to engage the recess in the rod.

3. The combination with an automobile including chassis bars and a hood; of a vertically disposed hook rod adjustably mounted at each side of the hood; a socket member carried by each chassis bar and having a bore normally receiving the hook rod; a plunger reciprocably mounted in said socket member and having a head adapted to enter the bore and engage the hook rod to lock the latter therein; means for yieldably urging the plunger head into the bore; a coil spring around the rod having its upper end fixed and its lower end normally seated upon the socket member to raise said hook rod out of the bore when the plunger is retracted; and means operable from the dash board of the automobile for retracting the plunger to release the hook rod.

4. In a combination as set forth in claim 3, the hook rod having an undercut recess in its side; and the plunger head being wedge shaped with the larger end outermost to engage the recess in the rod.

5. In a locking device for automobile hood side members, a hook rod carried by each side member; a fixed socket member having a bore normally receiving the hook rod; a plunger reciprocably mounted in the socket member and having a head normally entering the bore to engage the hook rod to lock the latter therein; and a flexible member for retracting the plunger; said plunger having an axial bore reducing in diameter towards its outer end; and the end of said flexible member having a head wedged in the bore of the plunger.

6. In a locking device for automobile hood side members, a hook rod having an undercut recess at its lower end carried by each side member; a fixed socket member having a bore normally receiving the hook rod; a plunger reciprocably mounted in the socket member and having a head normally entering the bore to engage the hook rod to lock the latter therein; and a flexible member for retracting the plunger; said plunger having an axial bore reducing in diameter towards its outer end and said flexible member having a head wedged in the bore of the plunger; the head of the plunger being wedge shaped in form with the larger end outermost to engage the recess in the rod.

7. In a locking device for automobile hood side members, a latch for each side member; rods for operating said latches and extending through the dash board adjacent each other; and a lock on the dash board having a sliding bolt disposed adjacent the rods and adapted to enter slots in said rods to prevent movement of said rods until the sliding bolt is retracted.

8. In a locking device for automobile hood side members; a latch for each side member; a pair of bell crank levers mounted on the dash board; operating members connecting the latches with one leg of their respective bell crank levers; push rods connected with the other legs of the bell crank levers and extending through the dash board adjacent each other; and a lock on the dash board having a sliding bolt adapted to enter slots in both rods to prevent movement thereof until retracted.

9. In a locking device for automobile hood side members; a hook rod on each side member; a socket member receiving each hook rod; latch means in each socket member adapted to engage the hook rod; a pair of bell crank levers mounted on the dash board; a flexible member connecting each latch means with one leg of its respective bell crank lever; push rods connected with the other legs of the bell crank levers and extending through the dash board adjacent each other; and a lock on the dash board having a sliding bolt adapted to enter slots in said rods to prevent movement thereof until the bolt is retracted.

10. In a locking device for automobile hood side members; a hook rod carried by each side member; a fixed socket member having a bore receiving the hook rod; a plunger reciprocably mounted in the socket member and having a head normally entering the bore to engage the hook rod; a pair of bell crank levers mounted on the dash board; flexible members connecting the plungers with one leg of their respective levers; push rods connected with the other legs of the bell crank levers and extending through the dash board adjacent each other; and a lock on the dash board having a sliding bolt adapted to enter slots in said rods to prevent movement thereof until the bolt is retracted.

ARTHUR AMBROSE VAN NOTE.